United States Patent [19]
Mills

[11] 3,784,247
[45] Jan. 8, 1974

[54] FOOT REST FOR TRUCKS

[76] Inventor: Billy R. Mills, 250 East St., Wasco, Calif. 93280

[22] Filed: Nov. 2, 1971

[21] Appl. No.: 194,932

[52] U.S. Cl.................. 296/75, 74/564, 297/433
[51] Int. Cl............................................. B60n 3/06
[58] Field of Search..................... 296/75; 180/90.6; 280/166; 74/564; 297/433

[56] References Cited
UNITED STATES PATENTS

| 2,507,807 | 5/1950 | Newbern | 190/90.6 |
| 2,218,060 | 10/1940 | Watson | 280/166 X |
| 1,637,588 | 8/1927 | Potter et al. | 296/75 |
| 1,774,555 | 9/1930 | Horsley et al. | 297/433 |
| 2,380,118 | 7/1945 | Martz | 296/75 |
| 2,651,944 | 9/1953 | Schetzer | 74/564 |

Primary Examiner—Kenneth H. Betts
Assistant Examiner—Leslie J. Paperner
Attorney—James R. Head et al.

[57] ABSTRACT

A driver's footrest for attachment to the interior of a vehicle including a base member having a vertical portion adapted to be affixed to a vehicle interior wall and an integral horizontal extending portion, an elongated step member pivotally affixed to the base member horizontal portion and pivotal between a horizontal position adaptable to receive the placement of the driver's foot thereon, for resting the driver, and pivotal in a vertical position wherein the foot rest is removed from interference with the driver.

1 Claim, 4 Drawing Figures

PATENTED JAN 8 1974  3,784,247

FOOT REST FOR TRUCKS

BACKGROUND, SUMMARY AND OBJECTS OF THE INVENTION

Fatigue of the legs is one problem which affects all vehicle drivers and especially those required to drive long distances. Truck driving is especially tiresome in that frequent depression of the clutch is required to shift gears during acceleration, deceleration, grade changes, and so forth. To alleviate the fatigue of continually moving the left foot from the floor board to the clutch and back, drivers frequently develop the habit of resting the left foot on the clutch pedal, particularly during times when frequent shifting is required. The weight of the foot on the clutch pedal applies pressure on the clutch mechanism. Such pressure, though much lighter than that which is applied to disengage the clutch, nevertheless causes increase wear on the clutch throwout bearing. The pressure applied by the driver resting his foot on the clutch, can, in some instances, cause slippage of the clutch, resulting in shorter clutch life.

This invention provides a device which eliminates the inclination of truck drivers to rest their left foot upon the clutch pedal. The invention provides a foot rest attachment for mounting on a vehicle interior wall adjacent the clutch pedal. The device provides a step member extending horizontally at a height equal to or just slightly above the normal nonengaged height of the clutch pedal. The driver can then rest his foot upon the foot rest and needs only to move his left foot slightly to the side to engage the clutch. This eliminates the necessity of continually moving the left foot from the floor board to the clutch and back.

It is therefore an object of this invention to provide a driver's foot rest. More particularly, an object of this invention is to provide a driver's foot rest for attachment to a vehicle interior wall adjacent to the vehicle clutch pedal providing a rest for the left foot of the vehicle driver.

Still more particularly, an object of this invention is to provide a driver's foot rest for attachment to a vehicle interior wall including a pivotally supported elongated step portion extending, in the first position, horizontally and adjacent to the clutch pedal, affording a foot rest, and extending in the second position vertically to thereby be out of the way of the driver's normal foot movement.

Still more particularly, an object of this invention is to provide a foot rest for attachment to a vehicle interior wall including a pivotally supported step member having a horizontal position adjacent to a clutch pedal, and a vertical position adjacent the interior wall, including a spring means for normally retaining the step member in the vertical position and out of the way of the normal movement of the driver.

These objects, as well as others, will be fulfilled in the apparatus to now be described, the description being taken in conjunction with the attached drawings.

DESCRIPTION OF THE VIEWS

DETAILED DESCRIPTION

Figure 1:
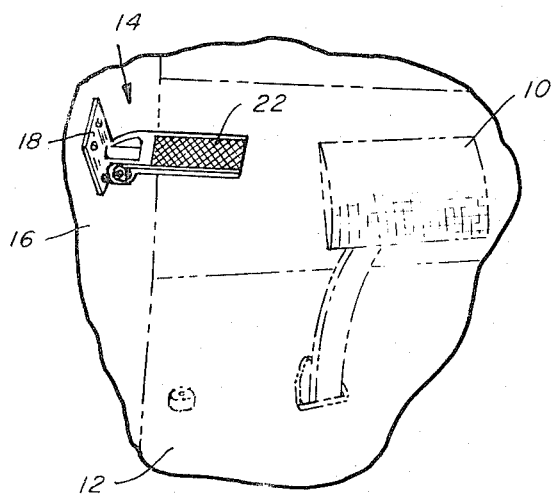
FIG. 1 is an isometric view of the driver's foot rest of this invention shown attached to the interior wall of a vehicle adjacent the vehicle clutch pedal.

Referring to FIG. 1, a portion of a vehicle cab is shown. While this invention may be utilized with any type of vehicle, and is useful to provide a foot rest even for vehicles having automatic transmissions, that is, without clutch pedals, nevertheless, a prime example of the usage of the device is as a foot rest for vehicles having a clutch pedal 10. In normal use the driver rests his foot on the floorboard 12 of the vehicle and is required to continually raise and lower his foot from the floorboard to the clutch pedal each time it is necessary to shift gears. The driver's foot rest of this invention, indicated generally by the numeral 14, is attached to the vehicle interior wall 16 which may be a portion of a door or a portion of a vehicle cab, usually referred to as a quarter panel. It is not relevant which portion of the interior wall of the vehicle is utilized as long as the foot rest 14 extends adjacent to clutch 10.

Figure 4:
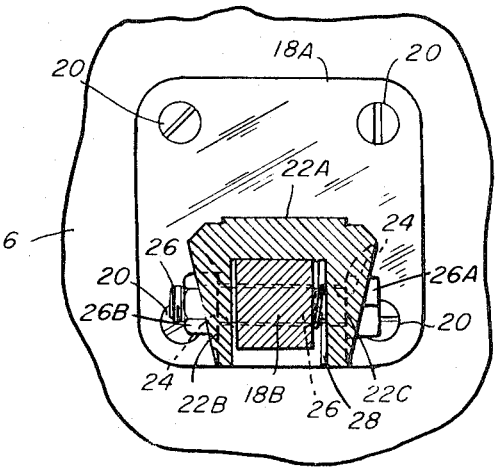
FIG. 4 is a cross-sectional view taken along the line 4—4 of FIG. 2.
Figure 2:
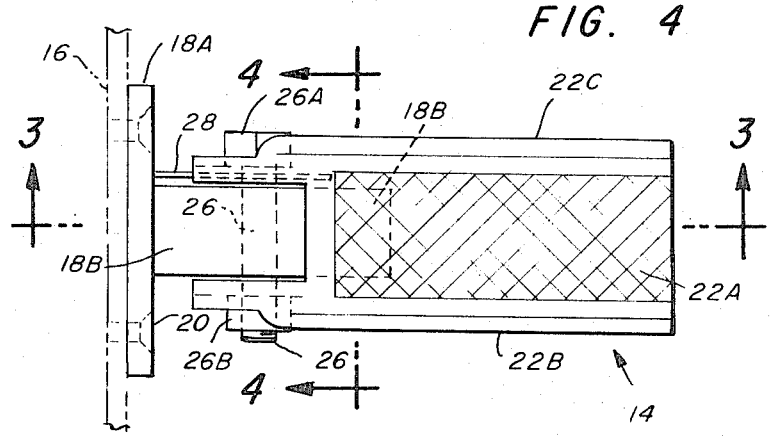
FIG. 2 is an enlarged top view of the driver's foot rest shown in the position in which it is used by a driver for resting his left foot thereon.
Figure 3:
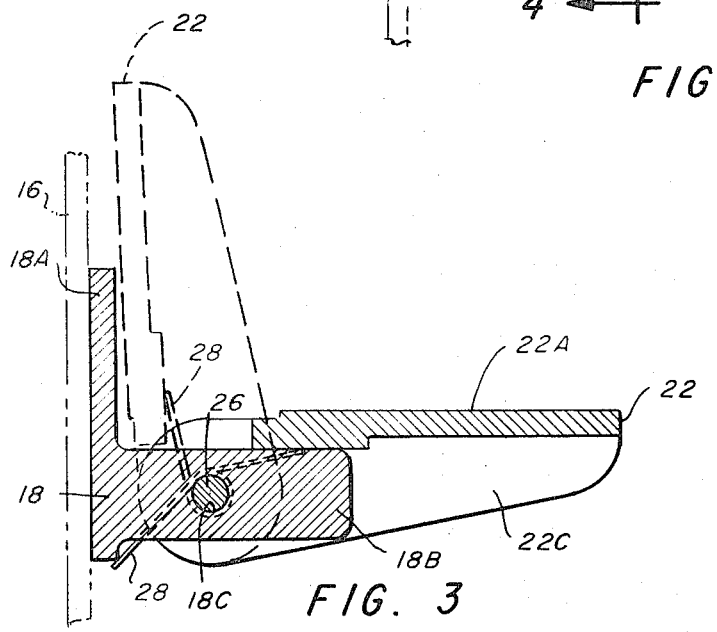
FIG. 3 is a cross-sectional view taken along the line 3—3 of FIG. 2. In dotted outline is shown the vertical position of the step member, which is the position occupied by the step member when the device is not in use.

Referring to FIGS. 2, 3 and 4, the foot rest 14 is shown in greater detail. A base member 18 has a flat vertical portion 18A adaptable to be affixed to the vehicle interior wall 16, such as by means of screws 20. Integrally extending from the base member vertical portion 18A is a horizontally portion 18B. In the illustrated arrangement the horizontally extending portion 18B is rectangular in cross section. An opening 18C extends through the horizontal portion 18B parallel to and spaced from the base portion 18A. Pivotally supported to the base member is an elongated step member 22. In the illustrated arrangement the step member is U-shaped in cross-sectional configuration, providing a flat portion 22A and an opposed downwardly extending wing portion 22B and 22C. Each wing portion has an aligned opening 24 which also aligns with opening 18C in the base member horizontal portion. Positioned within the aligned openings is a bolt 26 having a head 26A at one end and a nut 26B at the other. Bolt 26 pivotally supports step member 22 to the base member 18.

The step member 22 is pivotal between two positions. The first is a horizontal portion in which it is adjacent to vehicle clutch 10. Preferably, the height of the step member 22 above the floorboard 12 is equal to or just slightly greater than the height of clutch 10 when the clutch is normal maximum upward position. In this horizontal position the step member provides a foot rest for the left foot of the driver. The driver may easily move his foot from the clutch 10 to the step member 22 and rest his foot thereon without moving it to the floorboard 12. When the driver again wishes to apply pressure to clutch 10 he simply moves his left foot in a horizontal motion to transfer it to the clutch pedal. This way the driver is provided the ability to rest his foot without continually moving it to the floorboard and back.

The second position of the step member 10 is a vertical position as shown in dotted outline in FIG. 3. In this position the step member 22 is moved parallel and adjacent to the interior wall 16 of the vehicle and thereby is held away from the normal foot movement of the driver. The fact that the step member 22 is pivotal is important from a safety standpoint. In the event of an accident the pivotal movement of the step member prevents a driver from becoming entangled with the device or in any way prevented from rapid escapement from the vehicle cab if necessary.

As an additional safety feature a spring 28 is provided. The spring is looped around bolt 26 and extends between the base member 18 and a step member 22 and normally urges the step member into the vertical position as shown in dotted outline in FIG. 3. Thus, the foot rest is normally retained out of the way and in a safe position. When the driver wishes to utilize it, he merely puts his foot against the top edge of the foot member 22 and pushes it downwardly into the horizontal position.

Thus it can be seen that the device described fulfills all the objectives of the invention initially set forth. The foot rest provides a safe and effective means of affording increased comfort to a driver, and particularly truck drivers, and most important, provides a rest which the driver may utilize to relieve the tendency of keeping the left foot resting on the clutch pedal, thereby possibly shortening the vehicle clutch life.

While the invention has been described with a certain degree of particularity, it is manifest that many changes may be made in the details of construction and the arrangement of components without departing from the spirit and scope of this disclosure. It is understood that the invention is not limited to the specific embodiments set forth herein for purposes of exemplifying the invention, but is to be limited only by the scope of the attached claim or claims, including the full range of equivalency to which each element is entitled.

What is claimed:

1. A driver's foot rest for attachment to a vehicle interior wall comprising a base member having a vertical portion adaptable to be affixed to a vehicle interior wall, said base member having a horizontally extending portion integral with the vertical portion and having an opening therethrough parallel to and spaced from said vertical portion, said horizontally extending portion being of substantially rectangular cross-sectional configuration, an elongated step member having a flat portion, a pair of spaced wing portions provided at one end of said flat portion for spanning a portion of the horizontally extending base portion, said wing portions being provided with aligned openings in substantial coaxial alignment with the opening in the horizontally extending base portion, a bolt positioned in said openings in said horizontally extending base portion and said wing portions for pivotally supporting said step member to said base member, said step member engagable with the outer portion of the horizontally extending base portion in one relative position therebetween whereby the step is supported in a horizontal position by the base member being pivotal to the vertical position whereby the attachment offers minimum interference to the movement of the feet of the driver, and a spring means between said base member and said step member normally urging said step member to the vertical position thereof.

* * * * *